May 13, 1930.  J. H. FLATLEY ET AL  1,757,956
WHEELED HARROW FRAME ADJUSTMENT
Filed July 5, 1928
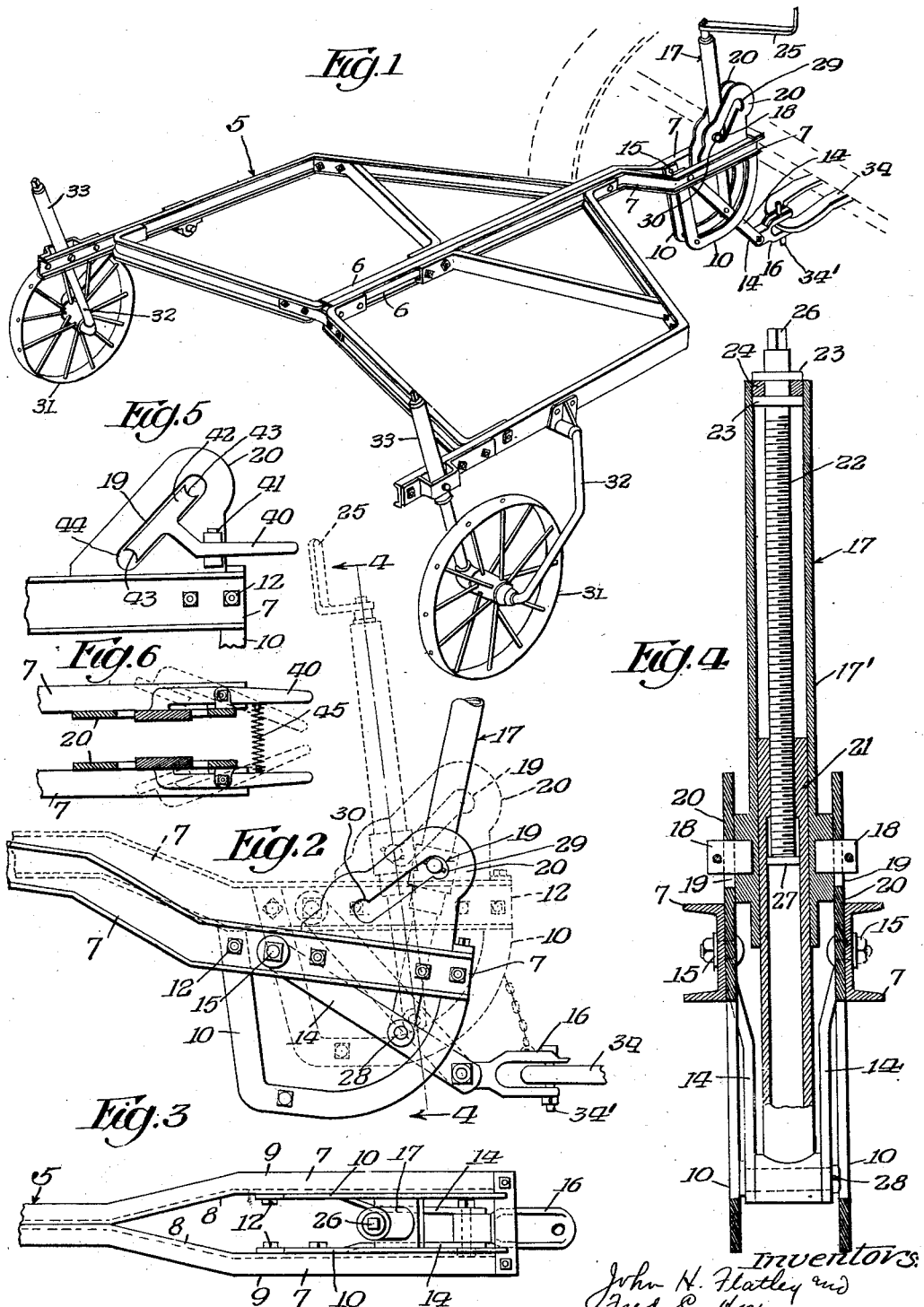

Patented May 13, 1930

1,757,956

UNITED STATES PATENT OFFICE

JOHN H. FLATLEY, OF LITTLE YORK, AND FRED C. HOY, OF MONMOUTH, ILLINOIS, ASSIGNORS TO BROWN LYNCH SCOTT CO., OF MONMOUTH, ILLINOIS, A CORPORATION OF ILLINOIS

WHEELED-HARROW FRAME ADJUSTMENT

Application filed July 5, 1928. Serial No. 290,338.

This invention relates to wheeled harrows such as disclosed and claimed in applications Serial No. 132,396, filed August 30, 1926, and Serial No. 249,581 filed January 26, 1928, owned by the present assignee, and it particularly relates to means for adjusting the harrow frame.

The object of the invention is to provide simple means of novel construction which can be easily and quickly operated to provide instant adjustment of considerable range to vary the depth of cut of the disk gangs and also to raise the disk gangs out of operative position when desired.

Another object of the invention is to provide means for making relatively fine adjustments to obtain the exact depth of penetration of the disk gangs, and also to permit a considerable range of adjustment so that the harrow may be easily and quickly attached to a tractor without lifting the harrow.

Another object is to provide adjusting means for securing the desired penetration of the disk blades and for holding the blades in adjusted position without locking the disks in fixed position.

In the accompanying drawing illustrating a selected embodiment of the invention, the views are as follows:

Fig. 1 is a perspective view of a wheeled harrow frame embodying the invention, the disk gangs being omitted.

Fig. 2 is a detail enlarged view of the improved means, and showing the adjusted position of the frame in broken lines.

Fig. 3 is a top plan view of the means shown in Fig. 2.

Fig. 4 is an enlarged sectional view of the adjusting means on the line 4—4 of Fig. 2.

Fig. 5 is a detail elevation of the adjusting means in a modified form.

Fig. 6 is a detail plan view of the apparatus shown in Fig. 5.

Referring to Figs. 1 to 4 of the drawings, 5 designates generally a frame such as disclosed and claimed in the co-pending application Serial No. 247,805, filed January 19, 1928, owned by the present assignee, and it comprises two center bars 6 which are bent and spread downwardly to form the spaced connecting bars 7, 7. The bars 7, 7 are made of channel iron with the webs 8, 8 on the inside and the flanges 9, 9 projecting outwardly therefrom. Parallel skeleton guides 10, 10 are carried by the bars 7, 7 and are connected to the webs 8, 8 of these bars and between the flanges 9, 9. The guides are secured to the bars by bolts or rivets 12, and a pair of draft levers 14 are pivotally mounted in a suitable manner between the arms 7, 7 at 15, 15 and project forwardly between the two guides 10, 10. A clevis 16, or other suitable device, is carried at the front end of the draft levers for connecting the harrow to a tractor or other machine.

A lifting device 17 comprising an outer tubular member 17' is provided with outwardly extending studs 18, 18 which are adapted to travel in slots 19, 19 in the side plates 20, 20 fixed to the bars 7. An inner tubular member 21 telescopes with the outer tubular member 17'. A bolt screw 22 is arranged to turn but not to move lengthwise in the outer tubular member 17', and it has threaded engagement with the inner tubular member 21. This screw bolt is conveniently provided with annular flanges 23, 23 which engage opposite sides of an internal annular flange 24 on the outer tubular member 17' whereby the screw bolt may be turned by the crank 25 on the square end 26 without causing the bolt to travel lengthwise in the member 17'. The screw bolt is preferably provided with an annular flange 27 at its lower end to act as a guard and stop, in the inner tubular member 21.

The draft levers 14 are pivoted to the lower end of the inner tubular member 21, at 28. The height of the clevis 16 is substantially fixed by its connection with the tractor and, therefore, manipulation of the crank 25 to turn the screw bolt 22 will cause the members 17' and 21 to telescope which will result in causing the draft levers 14 to swing on the pivot with the clevis as a fulcrum to raise or lower the front end of the harrow for adjusting the depth of cut of the disks and also for lifting the disks above the ground for transporting the harrow.

It is desirable to provide instant adjustment of considerable range to vary the cut of the disk gangs and also raise the gangs out of operative position when required, and this is accomplished by swinging the lifting device 17 so that the studs 18 will slide in the slots 19 and come to rest in either of the recesses 29 and 30 connecting with the slots. The frame may thus be instantly raised or lowered a considerable range by swinging the lifting device forward or back, or it may be adjusted by operating the screw 22, or the frame may be raised and lowered by swinging the lifting device and also by operating the adjusting screw. The lifting device acts as a lever and operates on the draft levers 14 to raise and lower the frame relative to the clevis which acts as a fulcrum. Wheels 31 are mounted on the arms 32 which are pivotally connected at their outer ends to the harrow frame, and adjusting devices 33 of the type claimed and disclosed in the aforesaid co-pending application, Serial No. 247,805, may be provided to raise and lower the wheels 31 to cause adjustment of the frame.

In practice, the clevis 16 is secured to the tractor draw bar 34 by a draw bolt 34', and the frame and clevis assume the position as shown in full lines in Fig. 2 with the lifting device 17 extending forwardly and the studs 18 engaging the recesses 29. When the operator desires to raise the disks from the soil, he may do so by operating the crank 25 which causes the screw bolt 22 to raise the frame relative to the clevis and draw bar, but when quick adjustment of considerable range is required, the tractor or other propelling means is stopped and the device 17 is tilted backward to disengage the studs 18 from the notches, or recesses 29. The tractor is then backed up which causes the draft levers 14 to raise the frame and the studs will slide down the slots 19 until they engage the recesses or notches 30 and assume the position shown in broken lines in Fig. 2. The frame is raised by the power of the tractor, and the device 17 is held in substantially fixed or locked position by the studs 18 in the recesses 30. The raising of the frame by the power of the tractor is particularly desirable if the tractor is in danger of becoming stalled while the disks are working in soft ground. When it is desired to again lower the frame to normal operating position, as shown in full lines in Fig. 2, the lifting device 17 is tilted forward to disengage the studs 18 from the recesses 30 and the tractor is started which will cause the draft levers 14 to swing the lifting device 17 and move the studs 18 upwardly in the slots 19 thereby lowering the frame until the studs 18 engage the recesses 29 when the frame will again be in normal operating position, as shown in full lines in Fig. 2. When transporting the harrow from one place to another, the lifting device 17 is swung rearwardly, as shown in broken lines in Fig. 2, and the crank 25 is operated to further raise the frame relative to the clevis.

Instead of providing the recesses 29 and 30, which communicate with the slot 19, a pair of arms 40 pivoted to the bosses 41 on the plates 20 may be provided. The two arms 40 are provided with plates 42 arranged within the slots 19 and these plates are cut away at their outer ends at 43, 43 to provide circular openings 44 to receive the studs 18 on the lifting device 17. An expansion spring 45 is arranged between the two arms 40 to spread the arms apart and keep the plates 42 in proper position in the slots 19. When the lifting device 17 is to be moved from one position to another, the arms 40 are depressed, as shown in dotted lines in Fig. 6, which moves the plates 42 out of the slots 19 and permits the levers 14 to swing the lifting device to adjusted position, the studs 18 sliding freely in the slots 19. After the studs have reached the end of their travel, to stop further movement of the device 17, the arms 40 are released and the plates 42 will again be received in the slots 19 and the lifting device will be held in adjusted position.

The invention provides simple and novel means for making fine adjustments of the frame to obtain the exact depth of penetration of the disk gangs and for making instant adjustment of considerable range to raise or lower the frame when required. By swinging the lifting device before the clevis is attached to the tractor the clevis is brought to proper attaching position without lifting the frame. It has been found in actual practice that the device can be quickly and easily operated from the operator's seat on the tractor and without special skill.

Changes may be made in the form, construction and arrangement of the parts without departing from the spirit of the invention or sacrificing any of its advantages, and the right is reserved to make all such changes as fairly fall within the scope of the following claims.

We claim:

1. The combination of a harrow having a frame, a forwardly extending lever pivoted at the front of said frame, a clevis pivotally connected to the front end of said lever for connecting the harrow to a tractor, a lifting device connected to the frame and pivoted to said lever and movable about its pivot for swinging said lever about its pivotal connection with the clevis as a fulcrum, to raise and lower the frame, and screw operated means on said lifting device for raising and lowering the frame independently of movement of said lifting device above its pivot.

2. The combination of a harrow having a frame, a forwardly extending lever pivoted at the front of said frame, means at the front end of said lever for attaching the harrow to a tractor, a lifting device pivoted to said lever for raising and lowering the frame relative to the tractor upon forward or rearward movement of the device, and screw means carried by said lifting device for raising and lowering the frame independently of the forward or rearward movement of the lifting device.

3. The combination of a harrow frame, a forwardly extending lever pivoted at the front of said frame, means at the front end of said lever for attaching the harrow frame to a tractor, plates fixed to said frame and having slots, a lifting device pivoted to said lever, and studs on said device and engaging said slots, said slots being so shaped that forward and rearward movement of said device will lower or raise the frame relative to the tractor.

4. The combination of a harrow frame, a forwardly extending lever pivoted at the front of said frame, means at the front end of said lever for attaching the harrow frame to a tractor, plates fixed to said frame and having slots, a lifting device pivoted to said lever, studs on said device and engaging said slots, said slots being so shaped that forward or rearward movement of said device will lower or raise the frame relative to the tractor, and screw means in said device for raising or lowering the frame independently of the movement of said lifting device.

5. The combination of a harrow frame, a forwardly extending draft lever pivoted at the front of said frame, means at the front end of said draft lever for attaching the harrow frame to a tractor, plates fixed to said frame and having cam slots, an operating lever pivoted to said draft lever, studs on said operating lever and engaging said cam slots for swinging said draft lever during operation of the operation lever, to raise and lower the frame, and means for holding said operating lever in adjusted position.

6. The combination of a harrow frame, a forwardly extending draft lever pivoted at the front of said frame, means at the front end of said lever for attaching the frame to a tractor, an operating lever pivotally connected to said draft lever, studs on said operation lever, cam members on said frame adapted to be engaged by said studs when the operating lever is swung about its pivot for swinging said draft lever on its pivotal connection with the tractor as a fulcrum, to raise and lower the frame, means for holding said operating lever in adjusted position, and crank operated screw means carried by said operating lever to raise and lower the frame independently of the swinging movement of said operating lever.

7. The combination of a harrow having a frame, a forwardly extending draft link pivoted at one end to the front of said frame, means pivotally connected at the front end of said link for attachment to a tractor, plates on said frame having slots, an operating lever pivoted to said link and having studs engaging the slots, said slots being so shaped that the frame will be raised and lowered by the movement of the operating lever about its pivot, and means cooperating with said slots for limiting the movement of the operating lever and for holding it in adjusted position.

8. The combination of a harrow having a frame, a forwardly extending lever pivoted at the front of said frame, means at the front end of said lever for attaching the harrow to a tractor, plates connected to said frame, and having slots, an operating device pivoted to said lever, studs on said operating device and operating in said slots for raising and lowering the frame by the movement of the operating device to swing the lever, means cooperating with said slots for limiting the movement of the operating device and for holding said operating device in adjusted position, and screw means arranged in said operating device for raising and lowering the frame independently of the movement of said device.

9. The combination of a harrow having a frame, a forwardly extending lever pivoted at the front of said frame, means at the front end of said lever for attaching the harrow to a tractor, plates connected to said frame and provided with slots, an operating lever pivoted to said lever, studs on said operating lever and operating in said slots for raising and lowering the frame by the movement of the operating lever to swing the lever, and means pivoted to said plates and engaging said slots for holding the operating lever in adjusted position.

10. The combination of a harrow having a frame, forwardly extending links pivoted at the front of said frame, means at the front end of said links for attaching the harrow to a tractor, plates connected to said frame and having cam slots, an operating lever pivoted to said links and having studs movable in said slots for raising and lowering the frame, a pair of arms pivoted to said plates, plates connected to said arms and engaging said slots to hold the operating lever in adjusted position, and a spring for normally keeping said last named plates in said slot.

11. The combination of a harrow having a frame, a pair of forwardly extending links pivoted at the front of said frame, means at the front end of said links for attaching the harrow to a tractor, plates connected to said frame and having cam slots, an operating lever pivoted to said links and having studs movable in said slots for raising and lowering the frame, a pair of arms pivoted to said plates, plates connected to said arms and engaging said slots to hold the operating lever in adjusted position, a spring normally keeping said last named plates in said slots, and crank operated screw means carried by said operating lever for raising and lowering the frame independently of the movement of the operating lever about its pivot.

12. The combination of a harrow having a frame, draft links pivoted to said frame, a clevis connected to said links, a lifting device pivoted to said links for raising or lowering the frame during swinging operation of the lifting device, and crank operated means carried by the lifting device for providing additional raising or lowering means.

JOHN H. FLATLEY.
FRED C. HOY.